G. B. FOUTS.
TROLLEY SWITCH.
APPLICATION FILED JULY 30, 1915.
1,192,052.
Patented July 25, 1916.
2 SHEETS—SHEET 1.
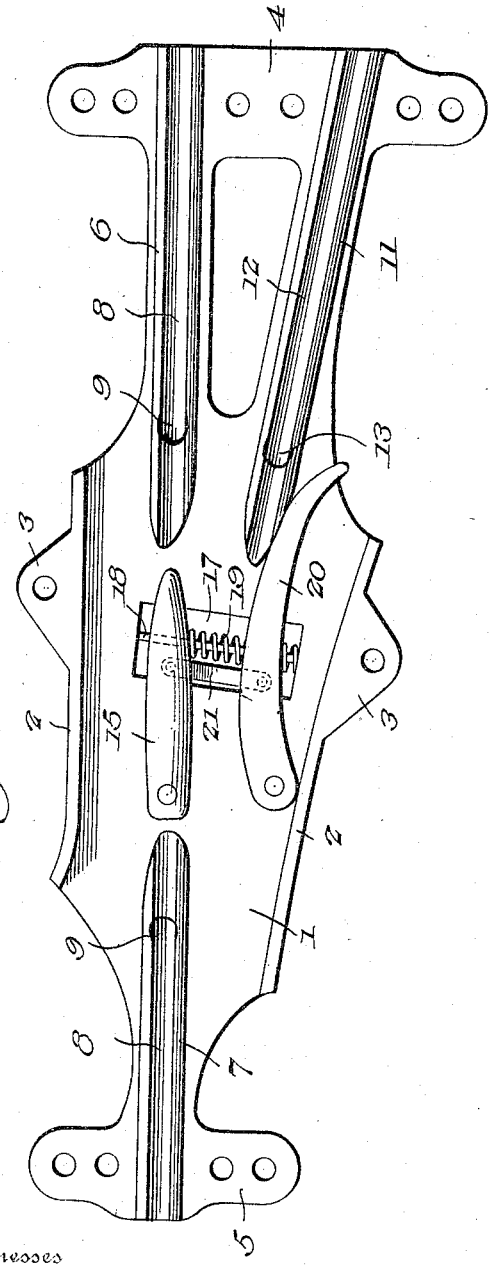
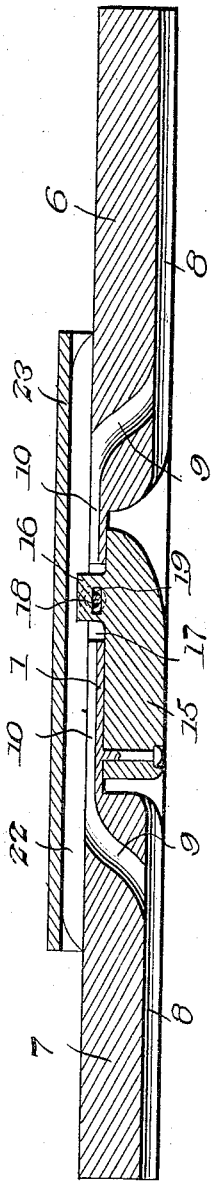
Witnesses
Inventor
George B. Fouts
By Victor J. Evans
Attorney G. B. FOUTS.
TROLLEY SWITCH.
APPLICATION FILED JULY 30, 1915.
1,192,052.
Patented July 25, 1916.
2 SHEETS—SHEET 2.
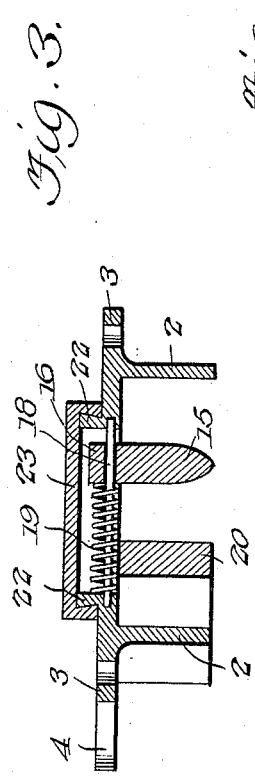
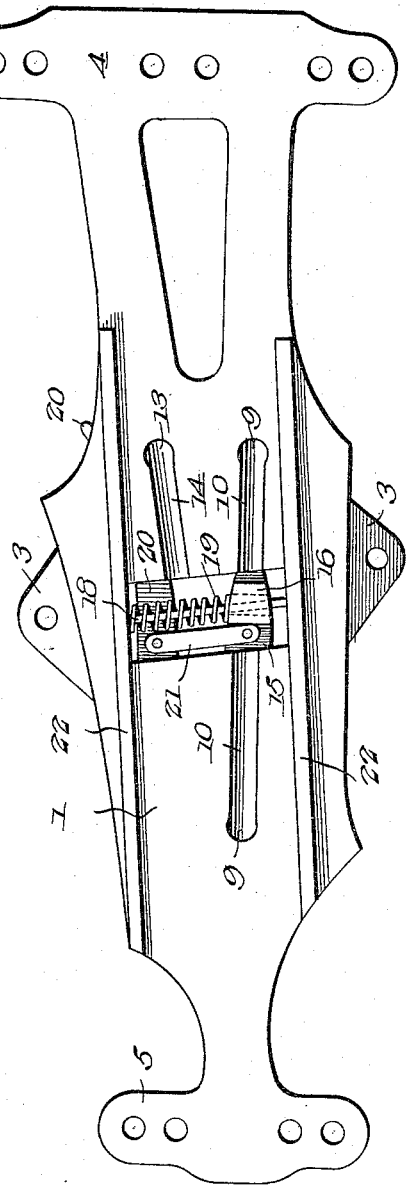
Witnesses
Hugh H. Ott
John J. McCarthy
Inventor
George B. Fouts
By Victor J. Evans
Attorney

UNITED STATES PATENT OFFICE.

GEORGE B. FOUTS, OF ALLIANCE, OHIO.

TROLLEY-SWITCH.

1,192,052.  Specification of Letters Patent.  Patented July 25, 1916.

Application filed July 30, 1915. Serial No. 42,795.

*To all whom it may concern:*

Be it known that I, GEORGE B. FOUTS, a citizen of the United States, residing at Alliance, in the county of Stark and State of Ohio, have invented new and useful Improvements in Trolley-Switches, of which the following is a specification.

This invention relates to improvements in trolley switches and has particular application to an automatic aerial switch whereby the trolley engaging the main overhead conductor in electric railroad systems may be guided to the branch conductor of the side track or a branch line of the road when the car is moving in one direction, while the trolley of the car moving in the opposite direction may be held on the main line conductor corresponding with the main line track.

In carrying out the present invention, it is my purpose to improve and simplify the general construction of switches of the class described and to provide an aerial trolley switch which will operate efficiently and effectively under all conditions, wherein the component parts will be so arranged and correlated as to reduce the possibility of derangement to a minimum and wherein the mechanism of the switch will be inclosed so as to prevent snow, ice, dirt, etc., accumulating in the mechanism.

With the above and other objects in view, the invention consists in the construction, combination and arrangements of parts hereinafter set forth in and falling within the scope of the claim.

In the accompanying drawings; Figure 1 is a bottom plan view of an aerial trolley switch constructed in accordance with the present invention. Fig. 2 is a longitudinal sectional view through the switch. Fig. 3 is a transverse sectional view therethrough. Fig. 4 is a top plan view of the switch, the cover being removed.

Referring now to the drawings in detail, 1 designates a supporting plate having the side edges thereof formed with depending flanges 2 provided with outwardly projecting connecting blocks 3 respectively adapted to receive supporting wires so that the plate may be held in proper position above the trackway. Formed on the opposite ends of the plate and projecting outwardly therefrom are supporting arms 4 and 5 respectively. Fastened to the under surfaces of the arms 4 and 5 and disposed in alinement with each other are trolley wire holding bars 6 and 7 respectively having the lower edges thereof formed with longitudinally extending grooves 8 merging into openings 9 formed in the respective bars 6 and 7 adjacent to the inner ends thereof and communicating with grooves 10 formed in the upper surface of the plate 1. These coöperating grooves and openings receive the ends of the sections of the trolley wire lying in the grooves 10 in the upper surface of the plate 1 and are fastened in such grooves in some suitable manner so that the sections will be held in trolley wire formation. Fastened to the under surface of the arm 4 adjacent to the bar 6 and disposed at an angle to the bar 6 corresponding to the angle of the siding or branch line is a bar 11 having the lower edge formed with a trolley wire receiving groove 12 terminating in an opening 13 formed in the bar 11 adjacent to the inner end thereof and communicating with a groove 14 formed on the upper surface of the plate 1 adjacent to one of the grooves 8. The end of the trolley wire suspended above the trackway of the branch line or siding will be held in engagement with the bars and the trolley conductor when passing the switch. This bar 15 is capable of swinging movement to establish a bridge between the bar 7 and the bar 11 and formed on the upper edge of the bar 15 adjacent to the inner end thereof is a block 16 working in a transverse slot 17 formed in the plate 1. Disposed within the slot 17 and secured to the end walls thereof is a guide rod 18 upon which the block 16 is slidably mounted and interposed between the block 16 and the end wall of the slot adjacent to the bar is a coiled expansion spring 19 acting upon the block to hold the bar 15 normally in alinement with the bars 6 and 7. Pivoted upon the plate 1 adjacent to the bar 11 is a curved shoe 20 normally lying against the bar 11 and connected through the medium of a link 21 with the bar 15.

The trolley wheel of a car traversing the main trackway, when passing the trolley switch, passes over the bar 6 onto the bar 7 by means of the bar 15, or, vice versa, from the bar 7 over the bar 15 and onto the bar 6, while the trolley wheel of a car passing onto the main line track from the branch line or siding, rides over the bar 11 and the flange thereof engages the adjacent end of the shoe 20 with the effect to swing the bar 15 against the action of the spring 19 to a position to bridge the bars 11 and 7 and the flange of the trolley wheel holds the shoe in this position as long as the wheel is in engagement with the swinging bar. When, however, the trolley wheel disengages the swinging bar, the shoe is released and the spring reacts to restore the swinging bar to normal position. Secured to the upper surface of the plate 1 at the opposite ends of the slot 17 are longitudinally extending ribs 22 and fastened to the upper edges of the ribs 22 is a cover 23 covering the slot 17 and the rods, spring and block in such slot, thereby preventing the ice, snow, dirt, etc., from accumulating in the slot.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A trolley switch comprising a supporting plate, arms on the ends of said plate projecting outwardly therefrom, alining trolley wire holding bars carried by said arms respectively and corresponding to the main line trackway and having the inner ends thereof spaced apart, a trolley wire holding bar carried by one of said arms adjacent to the first-mentioned bar thereon and corresponding to the branch line, a bridging bar pivoted between said first-mentioned bars and normally in alinement therewith, a shoe pivoted upon said plate adjacent to said bridging bar and having one end lying normally in contact with said second trolley wire receiving bar and adapted to be swung under the action of the trolley wheel on said bar, a link connection between said shoe and swinging bar whereby the latter will be swung into a position to bridge said second-named bar and one of said first-named bars, said plate being formed with a slot, a rod in said slot, a block on the upper edge of said swinging bar working within said slot and slidably receiving said rod, and a spring surrounding said rod and acting upon said block to hold said shoe and swinging bar in normal position.

In testimony whereof I affix my signature in presence of two witnesses.

GEO. B. FOUTS.

Witnesses:
D. M. ARMSTRONG,
W. J. WILLIAMS.

Copies of this patent may be obtained for five cents each, by addressing the "Commissioner of Patents, Washington, D. C."